United States Patent [19]

Spitzmesser et al.

[11] Patent Number: 4,896,410

[45] Date of Patent: Jan. 30, 1990

[54] METHOD OF ASSEMBLING TUBE ARRAYS

[75] Inventors: J. B. Spitzmesser; R. J. Cameron; F. D. Doty, all of Columbia; Brian L. Miller, Elgin, all of S.C.

[73] Assignee: Doty Scientific Inc., Columbia, S.C.

[21] Appl. No.: 356,116

[22] Filed: May 24, 1989

Related U.S. Application Data

[63] Continuation-in-part of Ser. No. 226,042, Jul. 29, 1988, abandoned.

[51] Int. Cl.$^4$ .............................................. B23P 15/26
[52] U.S. Cl. ............................... 29/157.3 C; 29/527.1; 29/577.5
[58] Field of Search .................... 29/157.3 R, 157.3 C, 29/157.3 H, 527.1, 527.5

[56] References Cited

U.S. PATENT DOCUMENTS

| | | | |
|---|---|---|---|
| 4,117,884 | 10/1978 | Frei | 165/175 |
| 4,175,308 | 11/1979 | Togashi | 29/157.3 C |
| 4,482,415 | 11/1984 | Mort et al. | 29/157.3 C |
| 4,578,850 | 4/1986 | Kerr et al. | 29/157.3 X |
| 4,676,305 | 6/1987 | Doty | 165/158 |

*Primary Examiner*—Timothy V. Eley
*Attorney, Agent, or Firm*—Brumbaugh, Graves, Donohue & Raymond

[57] ABSTRACT

A method of assembling a plurality of microtubes rigidly into position so as to facilitate their rapid interference pressing into metallic header tubestrips is disclosed that is particularly well suited for the Microtube-Strip (MTS) gas-gas counterflow heat exchanger design. The technique, utilizing fusible alloys, non-sacrificial fixtures, and a high speed, gas powered machine gun tube insertion device, permits tube alignment, insertion, and welding rates to exceed 1,500,000 pieces per day per production line at greatly reduced costs. The following sequence of operations is followed: the tubes are finished to the required length; the tubes are inserted into adjacent, parallel, precision, non-sacrificial spacer forms, similar in size and pattern to the header tubestrips but with precision, slip-fit, countersunk holes; the spacer forms are slid apart to near opposite ends of the tubes; caps are placed over the ends of the tubes to secure the tube ends; the tube-spacer-cap fixture assembly is placed in a suitable mold; molten, fusible alloy is poured, or optionally it is vacuum-injected, into the heated mold; the mold is cooled below the solidus temperature; the encapsulated assembly is removed; the securing caps and spacer forms are slid off, exposing the tube ends; the assembly is loaded into a suitable fixture on a press and the header tubestrips are pressed onto opposite ends of the tubes; the fusible alloy is melted and cleaned from the assembly.

22 Claims, 4 Drawing Sheets

METHOD OF ASSEMBLING TUBE ARRAYS

This is a continuation-in-part of application Ser. No. 226,042, filed Jul. 29, 1988, now abandoned.

BACKGROUND OF THE INVENTION

The field of this invention is methods of manufacturing heat exchangers, and, more particularly, those employing arrays of parallel, single-wall tubes. The technique disclosed is particularly well suited for the Microtube-Strip (MTS) design of Doty, U.S. Pat. No. 4,676,305, but it is also advantageous in numerous other designs.

The instant invention pertains to a method of assembling a plurality of microtubes rigidly into position so as to facilitate their rapid interference pressing into metallic header tubestrips. As such, this invention is distinguished from numerous patents that pertain to tube welding techniques or chamber forming techniques or manifolding techniques.

This invention allows a reduction in the cost of tube alignment, insertion, and welding to typically less than one U.S. dollar (1988) per 100 tubes, compared to the current typical manufacturing costs of 100 to 1000 times that amount for typical heat exchangers. This invention permits tube alignment, insertion, and welding rates to exceed many hundreds of thousands of pieces per day per production line.

The instant invention utilizes fusible alloys in the common manufacturing usage: alloys with relatively low melting points that are intended to be repeatedly solidified and reheated for temporary manufacturing purposes. Fusible alloys are substantially from the following elements: bismuth, lead, tin, cadmium, indium, zinc, silver, and antimony. Melting points of the common fusible alloys range from about 46° C. to about 222° C., but those alloys with liquidus points below 105° C. are best suited for rapid cycling applications employing water cooling. They are also less prone to wet the surface of and form metallurgical bonds to the microtubes and fixtures. Several examples of such alloys are: (1) 44.7% Bi, 22.6% Pb, 8.3% Sn, 5.3% Cd, 19.1% In, eutectic at 46.8° C.; (2) 50.7% Bi, 30.9% Pb, 15% Sn, 3.4% Cd, solidus 70° C., liquidus 84° C.; (3) 52.5% Bi, 32% Pb, 15.5% Sn, eutectic at 95° C.

Marco, U.S. Pat. No. 3,364,548, discloses the use of sacrificial tooling in a method of producing electroformed heat exchangers with at least two independent fluid flow chambers by means of reactive metals, electroplating, masking, and chemical etching. Such a technique is relatively slow, costly in materials and supplies, and environmentally hazardous, and it does not address the problem of high speed assembly of millions of microtubes.

Holmes, U.S. Pat. No. 3,961,010, uses fusible alloys to hold tubes in position and to occupy space in a method of forming heat exchanger arrays and headers by means of plastic injection molding. Frei, U.S. Pat. No. 4,117,884, uses pins and strips to position and space 6 mm to 12 mm glass tubes to allow elastomeric headering. Kerr et al, U.S. Pat. No. 4,578,850, uses resilient, elastomeric gaskets, sandwiched captive between metal header plates, to eliminate tube welding. Such techniques are not applicable to high temperature exchangers and do not adequately address the problem of high speed assembly. Moreover, the techniques of Frei and Kerr are not usable with microtubing.

SUMMARY OF THE INVENTION

The following sequence of operations is followed to permit the pressing of header tubestrips onto a large number of precision tubes simultaneously, under interference fit: the tubes are finished to the required length; the tubes are inserted into adjacent, parallel, precision, non-sacrificial spacer forms, similar in size and pattern to the header tubestrips but with precision, slip-fit, countersunk holes; the spacer forms are slid apart to near opposite ends of the tubes; caps are placed over the ends of the tubes to secure the tubes; the tube-spacer-cap fixture assembly is placed in a suitable mold; the mold is optionally loaded into a gas-tight chamber which is connected to a vacuum pump; the chamber is optionally evacuated; a molten, fusible alloy is poured into the optionally sealed mold under low pressure; the chamber is optionally pressurized to one atmosphere and opened; the mold is removed from the chamber and allowed to cool below the solidus temperature; the encapsulated assembly is removed; the securing caps and spacer forms are slid off, exposing the tube ends; the assembly is loaded into a suitable fixture on a press and the header tubestrips are pressed onto opposite ends of the tubes; the fusible alloy is melted and cleaned from the assembly.

DETAILED DESCRIPTION OF THE PREFERRED EMBODIMENT

Figure 1:
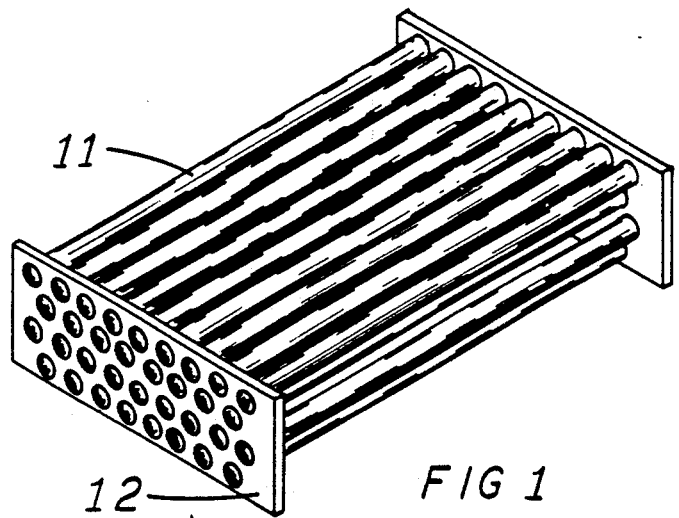
FIG. 1 illustrates the finished product, the MTS subassembly, according to the prior art.

The instant invention is a high volume, assembly line production technique for MTS subassemblies as shown in FIG. 1. As such, it requires the prior manufacture and inventory of large quantities of microtubes 11 and header tubestrips 12 to suitable high precision, according to the prior art. Since the technique utilizes a combination of precision, non-sacrificial, recyclable fixturing along with fusible alloys, such fixturing must be manufactured and inventoried in sufficient quantity to accommodate the desired production rates for the available cycle times.

Figure 2:
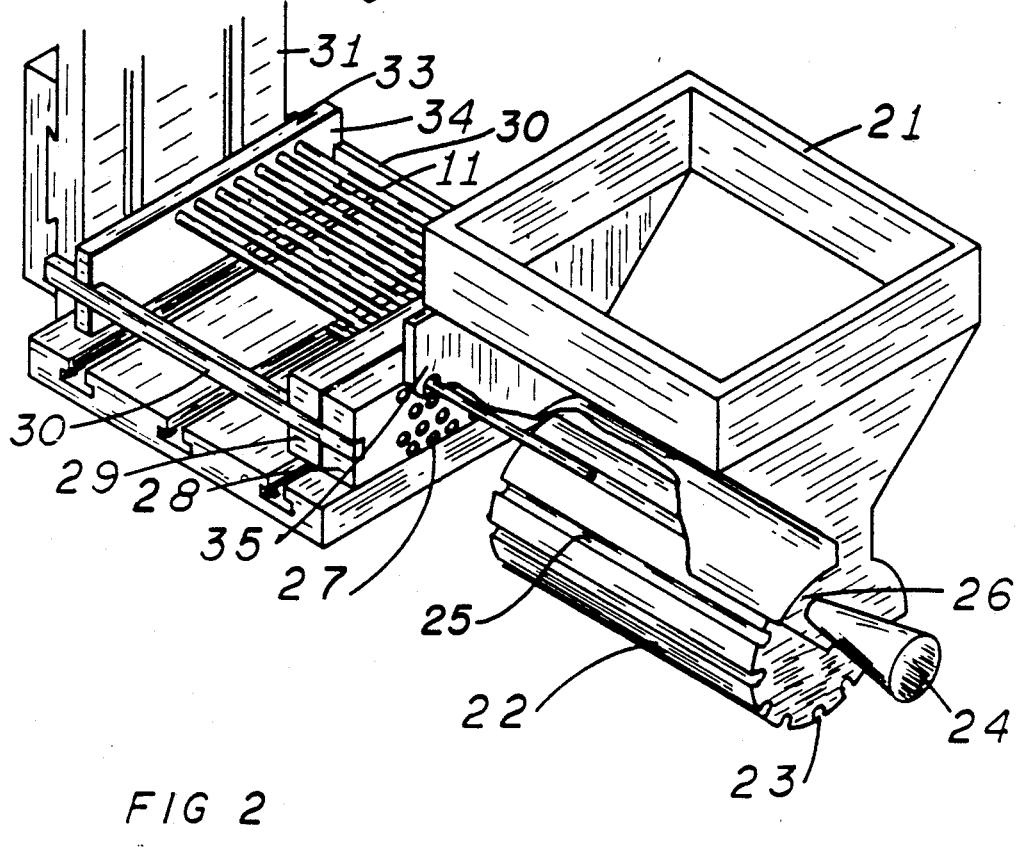
FIG. 2 shows precision, finished tubes being inserted into precisely aligned spacer forms with slip-fit, countersunk holes.

FIG. 2 illustrates the first crucial operations and apparatus. Large quantities (thousands, or even hundreds of thousands) of finished microtubes 11 are loaded into the hopper 21 of a high speed tube insertion apparatus or microtube machine gun. A feeder mechanism dispenses microtubes 11 individually from the hopper 21 to a firing (dispensing) chamber 25. In the illustrated, preferred embodiment, the feeder mechanism consists of a light-weight indexable rotary cylinder 22 with equally spaced, axially directed, precision grooves 23 on its outer surface. The grooves will accept no more than one microtube at a time. They serve to dispense the microtubes 11 individually from the hopper 21 into alignment with a controllable compressed gas jet 24, at which point they serve as a portion of the firing chamber 25 in cooperation with the guide sleeve 26.

Firing rates in excess of 20 tubes per second are achievable with current stepper motor technology with gas jet pressures of 4 bar and microtube lengths of 0.2 m. Microtube exit velocities may be well in excess of 10 m/s.

The microtubes 11 are fired sequentially into the precision slip-fit holes 27 of two precisely aligned spacer forms 28 and 29 which are secured on rails 30 of a fixture on a controllable, low inertia, stepper motor driven, X-Y table 31. The slip-fit holes 27 are typically 4 to 50 $\mu$m larger than the microtubes 11 and are countersunk to facilitate alignment and insertion. The stop plate 33 is covered with damping material 34 (such as a soft polymer, such as polyethylene, tetrafluroethylene, or PTEE, e.g. "Teflon") having a high mechanical loss factor to absorb recoil energy. The gas jet 24 also serves to return the microtube into position upon recoil, and a retainer plate 35, fixed in location with respect to the firing chamber 25, keeps the tubes 11 in position. The X-Y table 31 positions the empty holes 27 sequentially in alignment with the firing chamber 25 until microtubes 11 have been inserted into all appropriate holes. The fixture-tube assembly is then removed from the X-Y table 31.

Figure 3:
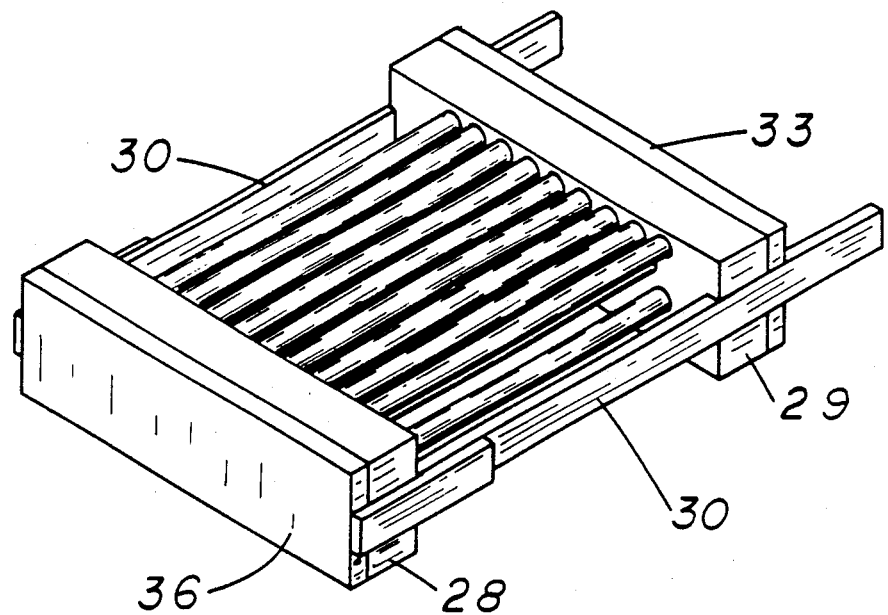
FIG. 3 shows a completed tube-spacer-cap fixture assembly.

FIG. 3 illustrates the completed tube-spacer-cap-fixture assembly that results. The second spacer form 29 has been slid back along rails 30 away from spacer form 28 to the stop plate 33, and a cap 36 is secured over the exposed ends of the microtubes 11.

Figure 4:
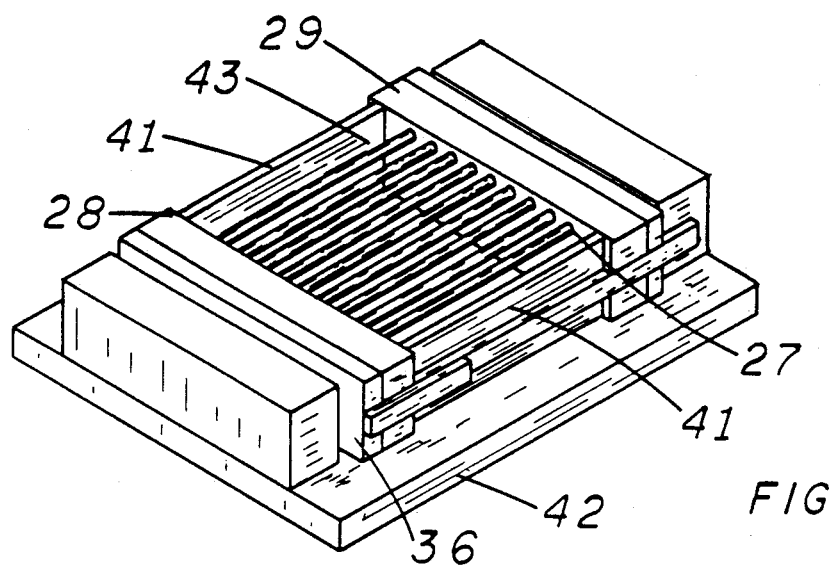
FIG. 4 shows a tube-spacer-cap assembly in a mold.

FIG. 4 shows a mold fixture, suitable for pour molding, for use with tubes having outside diameter larger than about 1 mm and spaced apart so that there is more than about 1 mm between tube surfaces. Side plates 41, mounted on the bottom plate 42 of the mold fixture, seal against the spacer forms 28 and 29 to form the four sides of a mold cavity 43 around the microtubes 11. The slip-fit holes 27 form adequate seals around the microtubes 11 for high viscosity, non-wetting fusible alloys. The spacer forms may be slid firmly against the side plates 41 to form likewise adequate seals and clamped into position. A molten, non-wetting, fusible alloy is poured into the cavity, covering the microtubes 11. The casting assembly is then moved to a cold plate and allowed to solidify. After solidifying, the clamps are released, allowing the encapsulated assembly to be removed from the mold fixture. (The mold fixture may be cleaned and reused.)

Figure 5:
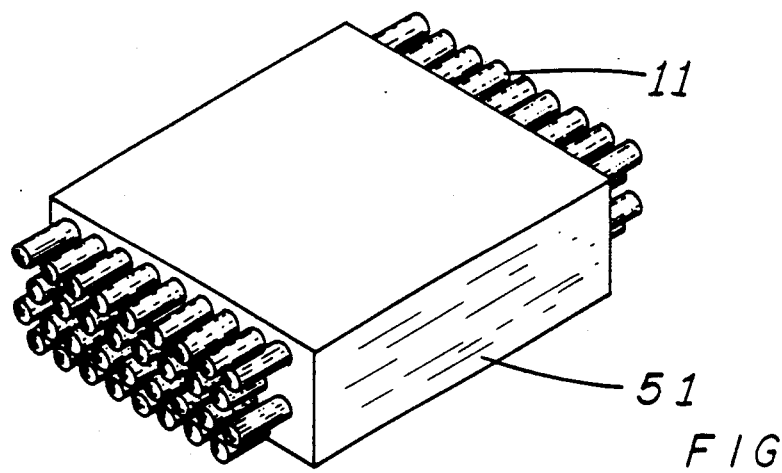
FIG. 5 shows an assembly of tubes encapsulated in a fusible alloy with the tube ends exposed.

The cap 36 and spacer forms 28 and 29 and fixture may then be removed (and later reused), leaving the array of microtubes 11 as shown in FIG. 5, with their exposed ends extending from the matrix of the solidified fusible alloy 51.

Figure 6:
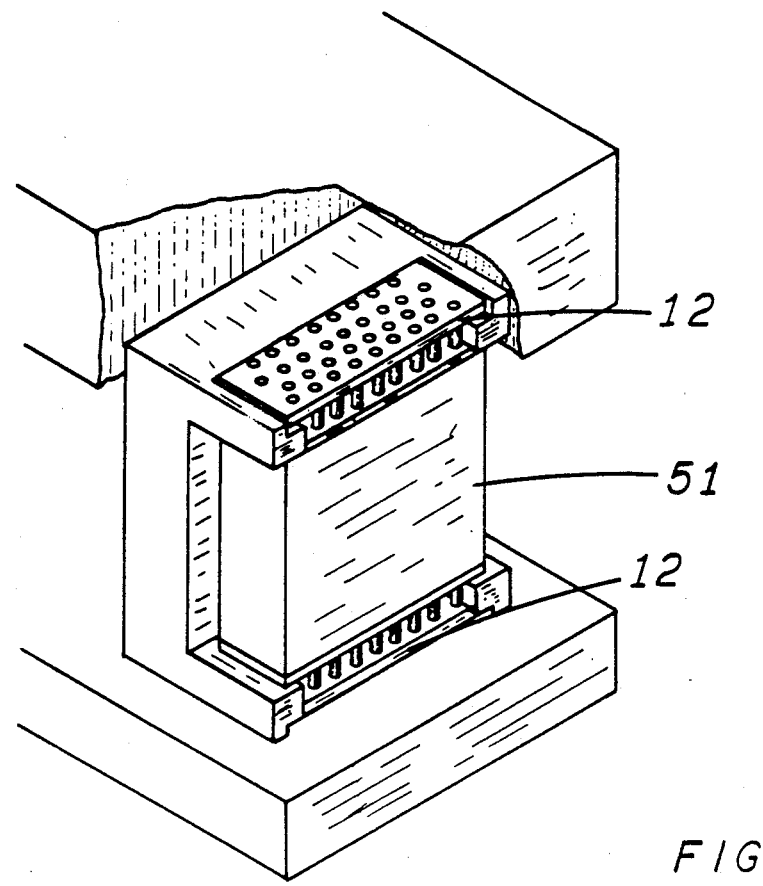
FIG. 6 shows tubestrips being pressed onto the encapsulated tube assembly.

The encapsulated tube array 51, FIG. 5, is then loaded, along with two header tubestrips 12, into a suitable locating press fixture as shown in FIG. 6, to permit pressing, in interference fit, the tubestrips 12 onto the ends of the microtubes 11 the required distance. The tubestrips may be pressed on past the ends of the tubes to accommodate a second pair of tubestrips if necessary.

Finally, the fusible alloy may be removed from the subassembly by melting. Vibration, gas jets, and chemical cleaning can also be used if necessary. The interference fit of the microtubes 11 to the header tubestrips provides all the required mechanical support required of the MTS subassembly as shown in FIG. 1 for further processing.

Figure 7:
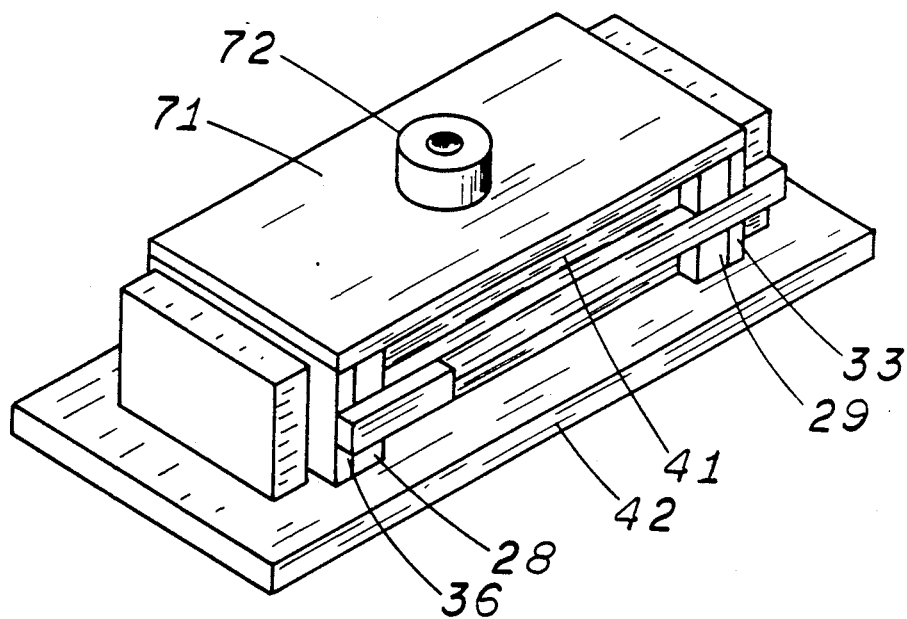
FIG. 7 shows a sealed mold for use in vacuum injection.

As the tube diameter and spacing becomes smaller than about 1 mm, it becomes necessary to utilize a low pressure vacuum injection technique to insure thorough encapsulation and support of the microtubes. The vacuum injection technique is well-known and widely used in the plastics molding industry, although it is seldom used with metals. Vacuum injection requires the use of a sealed mold as shown in FIG. 7 instead of the open mold of FIG. 4. A top plate 71 with fill opening 72 is secured above the side plates 41 and spacer forms 28 and 29 after the microtube-spacer-cap-fixture assembly has been loaded into the mold cavity.

Figure 8:
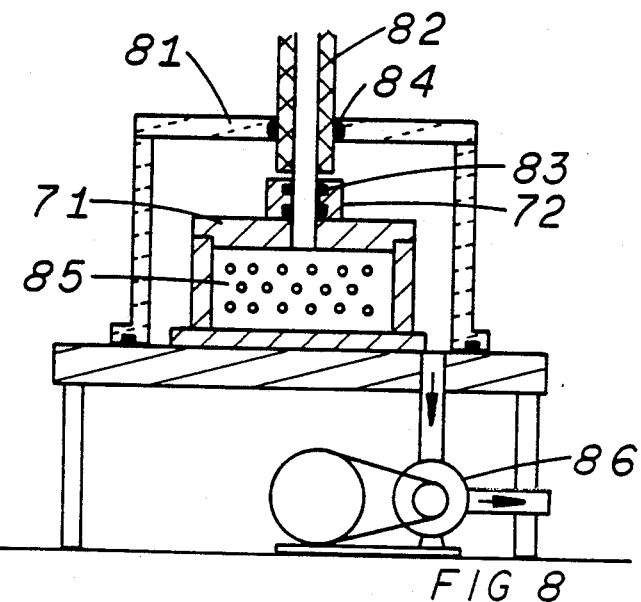
FIG. 8 shows a mold loaded into a gas-tight chamber.

The mold is then loaded into a gas-tight chamber 81 as shown in FIG. 8. The chamber is evacuated to rough vacuum conditions on the order of 5000 Pa. A heated liquid metal supply line 82 is inserted into the fill-port 72 on the evacuated mold and sealed elastomerically by seals 83 and 84. The molten fusible alloy, typically at atmospheric pressure or about 0.1 MPa, is inserted into area 85 of the sealed evacuated mold which is at the aforementioned low pressure maintained by vacuum pump 86. After filling, the chamber is permitted to reach atmospheric pressure and opened. The mold is then removed to a cold plate and allowed to solidify. Subsequent steps, equivalent to those described above for the pour molding technique, are followed to complete the microtube assembly process.

Although this invention has been described herein with reference to specific embodiments, it will be recognized that changes and modifications may be made without departing from the spirit of the present invention. All such modifications and changes are intended to be included within the scope of the following claims.

We claim:

1. A method for the automated assembly of arrays of microtubes, each of which has previously been finished to the required length, into parallel, planar rows and pressing header tubestrips, each of which has holes to receive the microtubes, said holes sized to permit interference fit, onto opposite ends of said microtubes, comprising the steps of:
    (1) inserting the tubes into parallel, precision, non-sacrificial spacer forms, similar in hole pattern to the header tubestrips but with precision, slip-fit countersunk holes; (2) sliding the spacer forms apart to near opposite ends of the tubes; (3) securing caps over the ends of the tubes to secure the tube ends; (4) placing the tube-spacer-cap fixture assembly in a suitable mold; (5) pouring a molten, fusible alloy into the heated mold; (6) cooling the mold below the solidus temperature of the fusible alloy; (7) removing the encapsulated assembly from the mold; (8) sliding off the securing caps and spacer forms, thereby exposing the tube ends; (9) loading the assembly into a fixture which holds the encapsulated assembly, and which holds header tube strips in alignment with the tube ends of the encapsulated assembly at the two opposite ends of the tubes; (10) pressing the header tubestrips onto opposite ends of the tubes; and (11) melting the fusible alloy and cleaning it from the assembly.

2. The method of claim 1 in which said insertion step is further characterized in that the tubes are inserted by use of a gun including a rotary, indexable, grooved cylinder.

3. The method of claim 2 in which said insertion step is further characterized in that the spacer forms are moved relative to the gun by means of a low inertia X-Y table with stepper-motor drive.

4. The method of claim 1 in which said holes are chambered and are precision, slip-fit relative to said microtubes.

5. The method of claim 1 further characterized in that the inserting step also comprises providing a stop plate behind the spacer forms, said stop plate covered with a soft polymer.

6. The method of claim 1 in which said spacer forms are adjacent prior to the step of placing the tube-spacer-cap-fixture in the mold.

7. The method of claim 1 in which said fusible alloy is substantially non-wetting on the surfaces of said microtubes, said spacer forms, and said mold.

8. The method of claim 1 in which said fusible alloy has liquidus point below 105° C.

9. The method of claim 1 in which said mold is of a high thermal conductivity metal and contains a major flat bottom surface for conduction cooling to an external, cooled, metal plate.

10. The method of claim 1 in which said melting and cleaning step further comprises the use of vibration and gas jets.

11. A method for the automated assembly of arrays of microtubes, each of which has previously been finished to the required length, into parallel, planar rows and pressing header tubestrips, each of which has holes to receive the microtubes, said holes sized to permit interference fit, onto opposite ends of said microtubes, comprising the steps of:

(1) inserting the tubes into parallel, precision, non-sacrificial spacer forms, similar in hole pattern to the header tubestrips but with precision, slip-fit countersunk holes; (2) sliding the spacer forms apart to near opposite ends of the tubes; (3) securing caps over the ends of the tubes to secure the tube ends; (4) placing the tube-spacer-cap fixture assembly in a suitable mold; (5) loading the mold into a substantially sealed chamber having a fill port; (6) evacuating the chamber; (7) injecting a molten, fusible alloy into the sealed mold; (8) permitting the chamber to reach atmospheric pressure; (9) opening the chamber and removing the mold from the chamber; (10) allowing the mold to cool below the solidus temperature; (11) removing the encapsulated assembly from the mold; (12) sliding off the securing caps and spacer forms, thereby exposing the tube ends; (13) loading the assembly into a fixture which holds the encapsulated assembly, and which holds header tube strips in alignment with the tube ends of the encapsulated assembly at the two opposite ends of the tubes; (14) pressing the header tube strips onto opposite ends of the tubes; and (15) melting the fusible alloy and cleaning it from the assembly.

12. The method of claim 11 in which said insertion step is further characterized in that the tubes are inserted by use of a gun including a rotary, indexable, grooved cylinder.

13. The method claim 12 in which said insertion step is further characterized in that the spacer forms are moved relative to the gun by means of a low inertia X-Y table with stepper-motor drive.

14. The method of claim 11 in which said holes are chambered and are precision, slip-fit relative to said microtubes.

15. The method of claim 11 further characterized in that the inserting step also comprises providing a stop plate behind the spacer forms, said stop plate covered with a soft polymer.

16. The method of claim 11 in which said spacer forms are adjacent prior to the step of placing the tube-spacer-cap-fixture in the mold.

17. The method of claim 11 in which said fusible alloy is substantially non-wetting on the surfaces of said microtubes, said spacer forms, and said mold.

18. The method of claim 11 in which said fusible alloy has liquidus point below 105° C.

19. The method of claim 11 in which said mold is of a high thermal conductivity metal and contains a major flat bottom surface for conduction cooling to an external, cooled, metal plate.

20. The method of claim 11 in which said melting and cleaning step further comprises the use of vibration and gas jets.

21. The method of claim 11 in which said chamber is capable of sealably connecting to a line for insertion of liquid metal.

22. The method of claim 21 in which said injecting step is performed under low pressure.

* * * * *